(12) United States Patent
Dibirdi et al.

(10) Patent No.: US 9,344,333 B2
(45) Date of Patent: May 17, 2016

(54) AUTOMATING NETWORK BUILD-OUT IN SELF BUILDING NETWORKS

(71) Applicants: Alcatel Lucent USA, Inc., Murray Hill, NJ (US); ALCATEL-LUCENT CANADA, INC., Ottawa (CA)

(72) Inventors: Alp Dibirdi, Andover, MA (US); Michael Long, Nepean (CA)

(73) Assignee: Alcatel Lucent, Boulogne-Billancourt (FR)

( * ) Notice: Subject to any disclaimer, the term of this patent is extended or adjusted under 35 U.S.C. 154(b) by 87 days.

(21) Appl. No.: 14/269,308

(22) Filed: May 5, 2014

(65) Prior Publication Data

US 2015/0319043 A1    Nov. 5, 2015

(51) Int. Cl.
*H04L 12/24* (2006.01)
*H04L 12/28* (2006.01)

(52) U.S. Cl.
CPC ........ *H04L 41/0886* (2013.01); *H04L 41/0806* (2013.01); *H04L 41/12* (2013.01)

(58) Field of Classification Search
None
See application file for complete search history.

(56) References Cited

U.S. PATENT DOCUMENTS

| | | | | |
|---|---|---|---|---|
| 2008/0188963 | A1* | 8/2008 | McCoy | G06F 9/54 700/90 |
| 2013/0347103 | A1* | 12/2013 | Veteikis | H04L 1/24 726/22 |
| 2014/0092884 | A1* | 4/2014 | Murphy | H04L 41/00 370/338 |
| 2014/0222987 | A1* | 8/2014 | Pearson | H04L 12/2409 709/224 |
| 2015/0023349 | A1* | 1/2015 | Wheeler | H04L 12/467 370/392 |

* cited by examiner

*Primary Examiner* — Chi H Pham
*Assistant Examiner* — Soon-Dong D Hyun
(74) *Attorney, Agent, or Firm* — Kramer & Amado, P.C.

(57) ABSTRACT

Various exemplary embodiments relate to a method performed by a network node device for provisioning the device on a network, the method including detecting one or more ports, sending discovery messages from one or more of the discovered ports, receiving an offer message including network information, storing the received network information, receiving a promotion message, and listening for discovery messages. In some embodiments, the method further includes receiving one or more messages including configuration information. In various embodiments, the configuration information includes one or more of node interface parameters, management parameters, OAM parameters, and MPLS parameters.

20 Claims, 3 Drawing Sheets

AUTOMATING NETWORK BUILD-OUT IN SELF BUILDING NETWORKS

TECHNICAL FIELD

Various exemplary embodiments disclosed herein relate generally to automating the build-out of networks and network components.

BACKGROUND

The provisioning of devices within a high-bandwidth communications network infrastructure is a non-trivial exercise. Each time a new device or network node ("node") such as a router, switch, gateway, or other network device is introduced into a network, the node needs to be configured with sufficient information such that it can start offering services. This type of initial configuration typically requires the involvement of a network engineer and is open to errors, including typos, address mismatches, etc. Although various existing tools may automatically provision an IP address and a gateway IP address for a node, this type of automated solution merely satisfies the reachability requirement for a device. Although reachability may be adequate for provisioning a termination device, end device, or customer premises equipment ("CPE") (for example a DSL modem, or E-UTRAN Node B in mobile networks ("eNB", also known as Evolved Node B), etc.) it is insufficient to prepare a node to provide most services offered by service providers, which usually require greater interoperability with other network nodes, and also typically have higher bandwidth requirements.

In such applications, many settings beyond reachability must be configured to achieve operability, including, for example, assignation of a form of interior gateway routing protocol (for example, Open Shortest Path First (OSPF), Intermediate System to Intermediate System (ISIS), Routing Information Protocol (RIP), etc.), remote manageability (e.g., via an Element/Network Manager (EMS or NMS) or a software-defined network (SDN) Controller), transport network configuration (for example, Multiprotocol Label Switching (MPLS) or Internet Protocol/Generic Routing Encapsulation (IP/GRE)), etc. In conventional configurations, these settings typically must be configured manually by a network engineer before the node may be ready to accept service definitions, after which the node may actually start offering services.

Some attempt has been made at avoiding manual configuration by creating and applying offline templates to nodes once the reachability requirement has been satisfied. However, such offline template creation likewise requires intensive manual work by a network engineer, and is similarly open to errors. As an example, when creating a template for Interior Gateway Protocol (IGP), the number of different parameters that must be selected and configured can easily be overwhelming, (for example, area id, preference, metric, authentication method, area-type, etc.)

Additionally, this type of offline template creation requires a thorough understanding of the functionality of the existing network and the underlying network topology—for example, knowledge of the type of node being installed and which other network nodes will have existing configurations usable for that type—and constant updating—every time there is a change in topology, which is common, templates must be reviewed and revised. Also, there are no standardized offline template creation tools, hence a network administrator wishing to create a template typically must access an existing node, download its configuration to a text file, and manually edit the document as described above. Because there is no error check mechanism, each new template must be uploaded to a node to check for errors. Such an error check only offers sanity check against known errors but can never verify if the configuration is relevant, correct and appropriate for a given section of the network.

Some existing implementations make use of a "satellite" solution to quickly bring up nodes throughout a network/area/region. A satellite solution basically treats each and every remote node as a line card on an extended chassis such that they do not need to be individually configured within their own chassis one at a time. In a satellite model, all user data from remote nodes, i.e. satellites, are backhauled/switched to a centralized or hub node and bound to services. Such a solution wastes bandwidth for any-to-any traffic flows (i.e. ×2 traffic in 4G/LTE) because all traffic is switched through the HUB node. Also, masquerading remote/satellite nodes from network operators may not be well received by all network operators, because when a whole node is treated like a remote-line card, physical components are masqueraded, turning the whole node into a black box from the standpoint of network operators—the visibility to individual components is significantly reduced, obfuscating the status of individual physical building blocks behind the operator's network. Furthermore, in such a configuration, performance metrics including delay, jitter and loss for various service types becomes hard to implement and support. Finally, such a satellite solution also requires extremely robust dedicated processing and bandwidth at the hub location. Therefore, although a satellite implementation may reduce provisioning costs for individual nodes, it does not lower the total cost of ownership due to high costs associated with the hub node and bandwidth overhead. Such a solution may be suited for a limited subset of network topologies such as hub and spoke topologies with extensive fiber build out where the transport network is owned by the same Service Provider, but more distributed alternatives, like partial-mesh or rings, introduce expensive problems including delays in communication between the hub and satellite nodes further away in the ring; furthermore, because the subset of applications is limited, the additional cost of satellite solutions outweighs its benefits.

SUMMARY

In light of the present need for an efficient, automatic method and system for provisioning network devices, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to automating network node discovery and provisioning. Various exemplary embodiments relate to a method performed by a network node device for provisioning the device on a network, the method including detecting one or more ports, sending discovery messages from one or more of the discovered ports, receiving an offer message including network information, storing the received network information, receiving a promotion message, and listening for discovery messages on one or more ports. In alternative embodiments, the network information includes one or more of a network interface address, a system address assigned to the network node device, a network node device network interface address, a loopback address for the network node device, and the default gateway address of the network node device. In some embodiments, the method further includes receiving one or more messages including configuration information. In various embodiments, the configuration information includes one or more of node interface parameters, management parameters, operations and management (OAM) parameters, and Multiprotocol Label Switching (MPLS) parameters.

In some embodiments of the invention, the management parameters include an address for a management device, and the method further includes sending one or more messages to the management device. In alternative embodiments of the invention, the method further includes receiving one or more messages including software information, installing the software on the device, and rebooting the device after the software is installed. In some embodiments, the discovery messages include authentication information. In various embodiments, the step of sending discovery messages from one or more of the discovered ports further includes scanning the full VLAN range. In some alternative embodiments of the invention, the step of storing the received network information further includes parsing configuration information from the offer message, and storing the configuration information to a data store corresponding to the port where the offer message was received. In other embodiments, the method further includes sending, to a server from which the offer message was received, a request for an active channel for information exchange.

Various exemplary embodiments relate to a method performed by a network device for provisioning a network node device on a network, the method including listening for discovery messages on one or more ports, detecting a discovery message from the network node device, the discovery message including a request for a network address assignment, sending to a server capable of dynamically distributing network configuration parameters a message including the request for a network address assignment, receiving a response from the server, sending to the network node device a message including the response from the server, collecting network configuration information from the network device, and sending to the network node device a message including the configuration information. In alternative embodiments of the invention, the configuration information includes one or more of node interface parameters, management parameters, operations and management (OAM) parameters, and Multiprotocol Label Switching (MPLS) parameters. In some embodiments, the discovery message further includes authentication information. In alternative embodiments, the discovery message further includes a request for one or more capabilities, and the step of collecting network configuration information from the network device further includes sending to a server node a message including the discovery message, wherein the server node is advertising the requested capabilities, and receiving one or more responses from the server node.

In some embodiments, the step of sending to the network node device a message including the configuration information further includes sending to the network node device one or more messages including the one or more responses from the server node. In various embodiments, the step of collecting network configuration information from the network device further includes collecting information from one or more of a port identified in the discovery message, one or more interface properties, and a template, and advertising the collected information. In alternative embodiments, the method further includes sending to the network node device a message that includes promotion information. In some embodiments of the invention, the method further includes recording virtual local area network (vLAN) information from the discovery message, and configuring, on the port where the discovery message was detected, a new interface based upon the vLAN information. In various embodiments of the invention, the method further includes deriving routing information for the network node from the response from the server, and storing the routing information in a routing table. In some alternative embodiments, the method further includes sending to the network node device a message including routing information for an other network node stored in the routing table, and deleting the routing information for the other node from the routing table.

It should be apparent that, in this manner, various exemplary embodiments enable automatic method and system for provisioning network devices. In particular, by a client device with a processor capable of performing the steps of detecting one or more ports, sending discovery messages from one or more of the discovered ports, receiving an offer message including network information, storing the received network information, receiving a promotion message, and listening for discovery messages on one or more ports; and a server device capable of performing the steps of listening for discovery messages on one or more ports, detecting a discovery message from the network node device, the discovery message including a request for a network address assignment, sending to a server capable of dynamically distributing network configuration parameters a message including the request for a network address assignment, receiving a response from the server, sending to the network node device a message including the response from the server, collecting network configuration information from the network device, and sending to the network node device a message including the configuration information.

BRIEF DESCRIPTION OF THE DRAWINGS

In order to better understand various exemplary embodiments, reference is made to the accompanying drawings, wherein.

DETAILED DESCRIPTION

In view of the foregoing, it would be desirable to automate network node discovery and provisioning activities. In particular, it would be desirable to provision new network nodes based upon the capabilities of existing network nodes.

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

As described above, the provisioning of network devices is conventionally an intensive manual process. A framework for Self-Building Networks (SBN Framework) executes fully automated network discovery and provisioning activities to implement configurations that are prerequisites for a new node to assume services and network functions. Such functions and roles include but are not limited to becoming a software-defined networking (SDN) client/node and being managed under self-organizing networks (SON) umbrella, and also are applicable to any network function virtualization (NFV) functionality. In order for a network device to offer services to other devices on a network, various configurations must be determined; for instance, the node must be installed with a 'certified' version of software; be made reachable, e.g., assigned IP addresses, have routing configured, form routing adjacencies; have Label Distribution Protocol (LDP) links established (in routers capable of MPLS); and, in network systems with a centralized controller, be made reachable via the controller (including service layout and establishment, end-to-end (e2e) provisioning, and L2 and L3 Precision Time Protocol (PTP) and Media Transfer Protocol (MTP) decisions); etc.

Critical configuration settings for nodes newly inserted to an existing network include the assignment of reachability (e.g., routing), manageability, MPLS, tunneling, failure detection protocols, and various other supporting features. An existing node or nodes must already have all such configuration in place so that they can offer services and function within the network. An SBN uses configured nodes to pass their configuration data to new nodes upon request. In an SBN, new nodes may be seamlessly added to existing infrastructure by leveraging the configuration or configuration of an existing node or multiple existing nodes on a network. For example, network information may be automatically provisioned in a new node based upon settings from existing nodes, e.g., IGP information such as OSPF/ISIS settings, Area/Level settings, etc.; MPLS settings such as LDP or Border Gateway Protocol (BGP), etc.; intrusion detection system (IDS) settings; or network management or monitoring system settings such as Simple Network Management Protocol (SNMP) read communities, access groups, Common Management Information Protocol (CMIP)/Common Management Information Service (CMIS) settings, or Remote Network Monitoring (RMON) settings.

The automatic configuration of a new node may include the configuration of network interfaces, and more than one interface may be configured to ensure seamless insertion to a ring, dual-horning, multi-homing, or other network topology. To ensure a network-wide common software release, the automatic configuration of a new node from existing nodes may include a software upgrade or downgrade. A new node in an SBN may not download a complete set of configurations upon initialization, but may download a partial set of configurations and request or wait for additional information from an administrator or network controller.

For example, the steps required to make a node part of a network may be automated to the point where the new node conforms to a common network level configuration, at which point L2/L3 services may be configured on the node. The configuration tasks that must be carried out prior to service-layer configuration may be automated where the configuration may be passed from an existing network element(s) to a new network element. Provisioning new elements based on the relevant configuration sections of existing elements eliminates the need for a centralized configuration repository. Each SBN server may advertise its capabilities, and the advertised capabilities may be automatically provisioned on the new node.

An SBN server may advertise its capabilities to neighboring SBN clients directly based on its existing configuration information. An SBN server may also rely in full or partially on an external database server for the configuration information, as dictated by the SBN server's configuration—parts of the local configuration may be used and parts may be retrieved from a database server, e.g. a Dynamic Host Configuration Protocol (DHCP) server. In some implementations, SBN servers may not respond if their capabilities do not match those requested or advertised by SBN clients.

A new node in a self-building network may use a keyword to demand configuration information from an existing well-established network node in a client and server relationship where the server (pre-existing node) is providing the configuration and the client (new node) is learning the configuration. An SBN client may use known extensible protocols such as, for example, DHCP (RFC-2131). An SBN server may use a protocol such as DHCP with vendor-specific options (RFC-2132). Additional readily available alternative protocols that may be used include IEEE 802.3ah EFM, or IEEE 802.1ag CFM together with ITU-T y.1731 CFM. Although no specific protocol is required to be used for SBN messaging, DHCP is used as an example below for purposes of discussing the details of exchanges between SBN servers and clients.

Using one such protocol, a self-building network may provision new nodes using a client-server architecture, where an SBN client is a new node to be added to a network, and an SBN server is an existing node that can provide configuration information to a new node. An SBN server may have previously been an SBN client, as described below. Although a fully-connected network is shown, an SBN may have any topology, e.g. point-to-point, bus, hub and spoke, ring, mesh, partial mesh, tree, hybrid, daisy chain, etc.

Various steps, detailed below, must take place to provision a new node in an SBN. New nodes configured as SBN clients may be referred to simply as SBN clients, or with reference to the SBN client application, as an SBN.Client (the same is true for a node configured as an SBN server, which may be referred to as SBN servers or an SBN.Server). As soon as an SBN client is physically installed, powered up, and basic network (e.g. IP) address assignment takes place, an SBN client advertises its presence to nodes configured as SBN servers (SBN server-capable elements, i.e. routers, switches, gateways, etc.) in the network. The SBN client may use DHCP or another protocol to advertise its presence, for example, using a DHCP discovery frame. Likewise, an SBN server may use DHCP or another protocol to advertise its network-related capabilities, for example, using a DHCP offer frame.

SBN functionality may be installed by an equipment manufacturer such that when a node is initially booted, it boots as an SBN client. In some embodiments, the SBN client mode may be disabled using a command line interface (CLI) or other user interface. If the SBN client mode is disabled, the new node may be booted conventionally without any automatic configuration acquisition capability.

When a new node is booted in SBN client mode, it may first start a self-discovery process where all detected line cards (if the node is in a modular chassis) or modules will first be automatically provisioned, and then each Ethernet or module port may be initialized one at a time. Discovery packets may be sent from each fully initialized port, e.g. using null encapsulation and scanning the full VLAN range. The SBN client discovery protocol may perform: automatic configuration of multiple interfaces; automatic provisioning to register a new node on the network; receiving and sending node and service capability announcements; and continuous operation, which will allow configuration settings to be adapted to network configuration changes and node additions and deletions. When a new node is introduced to the network as an SBN client, it will send (or "fire") SBN discovery packets which will advertise its presence and indicate to listening nodes that the network topology has changed. In some embodiments, discovery packets will include authentication information.

Once an SBN client has at least partially completed the self-discovery process, it must be introduced to the network in order to be reachable for additional configuration. In some topologies, this may require configuration (or re-configuration) of existing nodes; a new subnet may need to be assigned to the new device, or an existing IP address and subnet re-configured. In one embodiment, an IP address is not required—packets are sent to a loopback interface. In another embodiment, the "Any IP" feature built into the new node may be used to allow automatic assignment of a new IP address and subnet by an existing node (SBN server). An existing node in the network configured as an SBN server may continuously listen (on a designated port or interface) for discovery packets from new SBN clients. When an SBN server receives a discovery packet from an SBN client, it may respond with an SBN offer packet including reachability details (e.g., IP routing), management information (including security filters, etc.), transport tunnel configuration, fault detection mechanism system, etc. For example reachability information may include node-wide recognized key IP information (sys-ip+lo), or alternatively assigning an IP address for the network interface (intf.ip). One or more addressing schemes, such IPv4 and IPv6, may be supported by the network on which the SBN client and server reside; the SBN client may be pre-configured to use one or all of these schemes, or may acquire the addressing scheme from one or more SBN servers using the SBN protocol. Upon receipt of the messages from the SBN server, the SBN client programs the received information into its configuration file. Using the received configuration information the SBN client may now actively join the routing domain, make itself reachable to an Element/network Manager or an SDN Controller, and become ready to assume user traffic.

Various methods for the initial assignment of names, IP addresses, and gateway addresses to routers and switches are known to those of skill in the art.

In one implementation (described here with reference to DHCP, but which may implemented with other protocols such as IPv4 or IPv6), after initialization and IP address configuration or assignment, the SBN client sends a DHCP Discovery packet to the SBN server-enabled node in its path. At the SBN server-enabled node, a port or IP interface with SBN server capability continuously snoops incoming DHCP packets. If DHCP snooping capability is enabled on a port or a network interface, the SBN server application records any applicable L2 tag information. For example, if a dhcp.discovery packet arrives with vlan-tag having a value of 500, the SBN server will send a response with vlan-tag=500. Recording incoming virtual local area network (vLAN) information allows the SBN server application to automatically configure new IP interfaces on the relevant port used to communicate with new SBN clients.

In a typical IP assignment exchange between an SBN client and SBN server, an SBN offer packet or packets may contain one or more of: the SBN server network interface IP address, the system IP address assigned to the SBN client, the SBN client network interface IP address, the loopback IP address or the SBN client (for the unnumbered interface option), the default gateway IP address of the SBN client, or, to ensure homogeneity of the software installed on network nodes, a Uniform Resource Location (URL) address where software for the new node may be downloaded to bring the node in conformance with a network-wide 'certified' release. In some embodiments, the SBN server may get updated or different credentials from a DHCP server to send to the SBN client. In some embodiments, rather than send a URL to the SBN client, the SBN server may obtain software packages from a repository and send them to the SBN client.

If the discovery packet includes a URL for a certified software release, the URL may include an FTP server address, username, and password, directory information, and/or release information. If there is release information included with the URL address, it may include a list of directories and/or releases for each type of node, or the SBN server may detect the node type of the SBN client and send the correct directory and/or release information. Once the SBN client has completed downloading the software and completed the process of upgrading or downgrading to the downloaded release, the node will typically reboot itself and proceed with the IP address configuration received in the SBN offer packet in order to complete the remainder of its configuration based upon existing SBN sever nodes.

As an example, in a ring topology, routing information (i.e. IGP type, area id, area type, etc.) and manageability information (including security filters, transport protocol, etc.) are typically identical on all nodes within the same ring. Therefore, an existing fully-configured node that is also configured as an SBN server may pass along all relevant configuration automatically to a new node that is configured as an SBN client upon request by an SBN.Client application installed on the SBN client node. This framework turns all existing network nodes configured as SBN servers, preferably all existing network nodes, into helpers, such that when a new node is inserted, removed, or reconfigured, relevant portions of the existing nodes' running configuration may be passed along to next/new nodes without a need for manual intervention.

In one embodiment, upon reception of a DHCP Discovery packet, an SBN server populates the 'vendor specific' options fields of the DHCP payload with its own network configuration information. Because the SBN server only has access to its own network configuration information, the information included in a DHCP Offer packet or packets sent by the SBN server is limited to the information resident on the SBN server node. This restriction controls the flow of information to a newly-provisioned node, limiting its access to information about network topology to the SBN server node or nodes with which it is in direct contact.

A capability advertisement message or messages may include information about one or more of the node interface (e.g. through Bidirectional Forwarding Detection (BFD)), IGP information for OSPF or ISIS (e.g. area-id/level, authentication, BFD, metric, maximum transmission unit (MTU), timers, etc.), network management or monitoring system settings (e.g. SNMP community, access-groups, etc.), MPLS LDP information (e.g. hello and keep-alive timers), or service infrastructure such as targeted LDP (tLDP) (e.g. peer IP address information).

SBN Server capability advertisement may be limited to one of the supported options (i.e. IGP, management, LDP, etc.) or may be as broad as all the information that is relevant to bringing the SBN client to a level where it can start assuming service level configuration. Capabilities advertised as part of an SBN offer (which in one implementation is sent as a DHCP offer) may be automatically retrieved from a port, an interface, or a reference/template interface. In one example, in a ring topology where a new node is inserted to the ring, the configuration of an SBN server would match the entire relevant configuration for a new SBN client. Capturing the SBN server's live configuration settings and sending them to a requesting SBN client using vendor-specific options in DHCP messaging may be sufficient to fully configure the SBN client so it can begin offering services. While there are no limitations as to which capabilities may be advertised from an SBN server to an SBN client using SBN offer messaging, at minimum, to be fully functional an SBN client would have to receive from an SBN server configurations including: an IGP of choice (including IGP type, area/level information, metrics, preferences, etc.); management details (including community strings, access-list or filters in place to protect the management plane, IP and/or hostname of the management server(s), etc.); operations and management (OAM) capabilities (including heart-beat message of choice (i.e. BFD, IEEE 8021.ag/ITU-T y.1731 CFM MEP/MIP with Management Association and Management Domain details)); and MPLS/LDP parameters. As noted above, sharing capabilities between a functioning SBN server and SBN client ensures that the SBN client is brought to a network-standard configuration and is ready to start offering services.

In a self-building network, capabilities advertised by each SBN server are available to the SBN.Server application because the node was either manually configured by an administrator as an SBN server or SBN client, or installed by the manufacturer with an SBN.Client application and configured using settings from an SBN server before being promoted to be an SBN server (as discussed below). Because DHCP messaging is extensible (as are other available network messaging protocols), depending on the scope of capabilities advertised by the SBN.Server application, in an exemplary DHCP implementation the application collects capability information from the relevant port, ip.interface property/properties, or template, or a combination of these, and advertises the compiled configuration via pre-defined vendor-specific options fields of a DHCP.Offer message. Although in this example DHCP messaging is used to communicate messages between an SBN server and SBN client, neither the client nor server DHCP Server application will be involved in processing SBN messages; the same would apply if protocols other than DHCP were used. Messaging applications on SBN servers and clients may ignore SBN messages, or the messages may be intercepted by the SBN.Client and SBN.Server applications before reaching the message handlers for the relevant protocol, or the message handlers may be configured to pass SBN messages to the SBN.Client or SBN.Server applications. Options to be used for advertising different capabilities is predefined, hence when an SBN node receives an SBN message, it can parse the message to retrieve the relevant information; e.g., an SBN client may retrieve configuration information from an SBN offer message, and an SBN server may retrieve information from an SBN discovery message.

As noted above, when a new node is booted in SBN client mode, during or just after a self-discovery process each is initialized one at a time, and discovery packets may be sent from each fully initialized port. In this way, each port may be separately configured based on the offer packets it receives in response to the discovery packets it transmits. The information received by each client port will correspond to the information on the same port configured on the sending server—e.g., the same IGP configuration, area-id, metric, etc. A client may receive information from different servers for different ports, and thus port-specific information may differ within the same SBN server, or within a newly-configured SBN client. In one such exemplary implementation, once a DHCP.Offer packet is received by the requesting SBN client, the client parses the information within the payload of the offer and applies the configuration to the port or the interface where the Offer was received. Some received capabilities may be port/interface agnostic and such generic capabilities, for example, Management information, may be provisioned against the whole node. Either pre-defined SBN settings or options sent by the SBN server in the offer will indicate to the SBN client to which part of the configuration hierarchy the received offer information applies, where the entire offer may correspond to one hierarchy, or different elements of the message apply to different parts of the hierarchy. An SBN client may send multiple discovery or other request messages requesting configurations. An SBN client may receive multiple messages from an SBN server, or from different SBN servers, with different configuration settings, each for specific functions.

Using a CLI or other user interface, an installed template, or a separate configuration algorithm, the advertised capabilities of an SBN server may be altered to differ from the configuration actually installed on the node hosting the SBN.Server application. For example, for a particular network hop a different IGP metric might be required as compared to the metric in another hop at the SBN server. Some sub-parameter differences may be automatically determinable, and some may be desired by a network operator. Thus, a manual or automated over-ride of the configurations resident at the SBN server for practical functioning of the server node may be necessary in order to properly configure SBN clients, because the configuration required for proper client function may differ slightly from that of the SBN servers they are communicatively connected to. In situations where there are small differences between the configurations of SBN servers and clients, the majority of network provisioning may be automated using the majority of settings on existing servers, with the addition of either manual over-ride or automated fine-tuning of sub-parameters. Note that is a configuration or setting of a node is manually or automatically overridden, the SBN server will advertise the overridden capability rather than the setting actually configured on the node.

Once a SBN client has been fully configured to function within a network, it may be promoted to be an SBN server, ready to assist in the configuration of new nodes installed or configured as SBN clients. A newly-inserted node may be promoted to an SBN server as soon as the automatic provisioning process is complete. Promotion to an SBN server may happen as part of the SBN.Client application process, or may require receipt of one or more SBN promotion messages from one or more SBN servers from which the SBN client has received SBN offer messages. For example, an SBN client may need to receive an SBN promotion message on every port before being promoted to an SBN server, or may be configured to be promoted once it has received a minimum of required information to begin offering services in a network. A newly provisioned node may continue to function as an SBN client on some ports while already fully provisioned on other ports. Once a newly-provisioned node has been promoted to be an SBN server, it will have the same capability/configuration advertisement functionality of any other server on the network. In this way, a self-building network can be provisioned with a minimum of intervention from network administrators.

Depending on the protocol used to implement SBN messaging, additional messaging beyond SBN discovery and offer messages may be exchanged. In an exemplary DHCP implementation, an SBN client may finish a message exchange with a DHCP.Request message and expect a confirmation message in the format of a DHCP.Acknowledgment message. This step may not be required for all implementations of the SBN framework but in some implementations may be mandated by the Dynamic Host Configuration Protocol. However, additional messages required by the protocol used to implement SBN messages may occur in various implementations because, as noted above, the SBN framework does not mandate the use of any certain message type for the automatic advertisement of capabilities and instead may use existing well-defined client-server network messaging protocols that support options (where new type-length-value (TLV) elements may be defined in addition to required message elements). These additional messages would be familiar to one of skill in the art.

Referring now to the drawings, in which like numerals refer to like components or steps, there are disclosed broad aspects of various exemplary embodiments.

Figure 1:
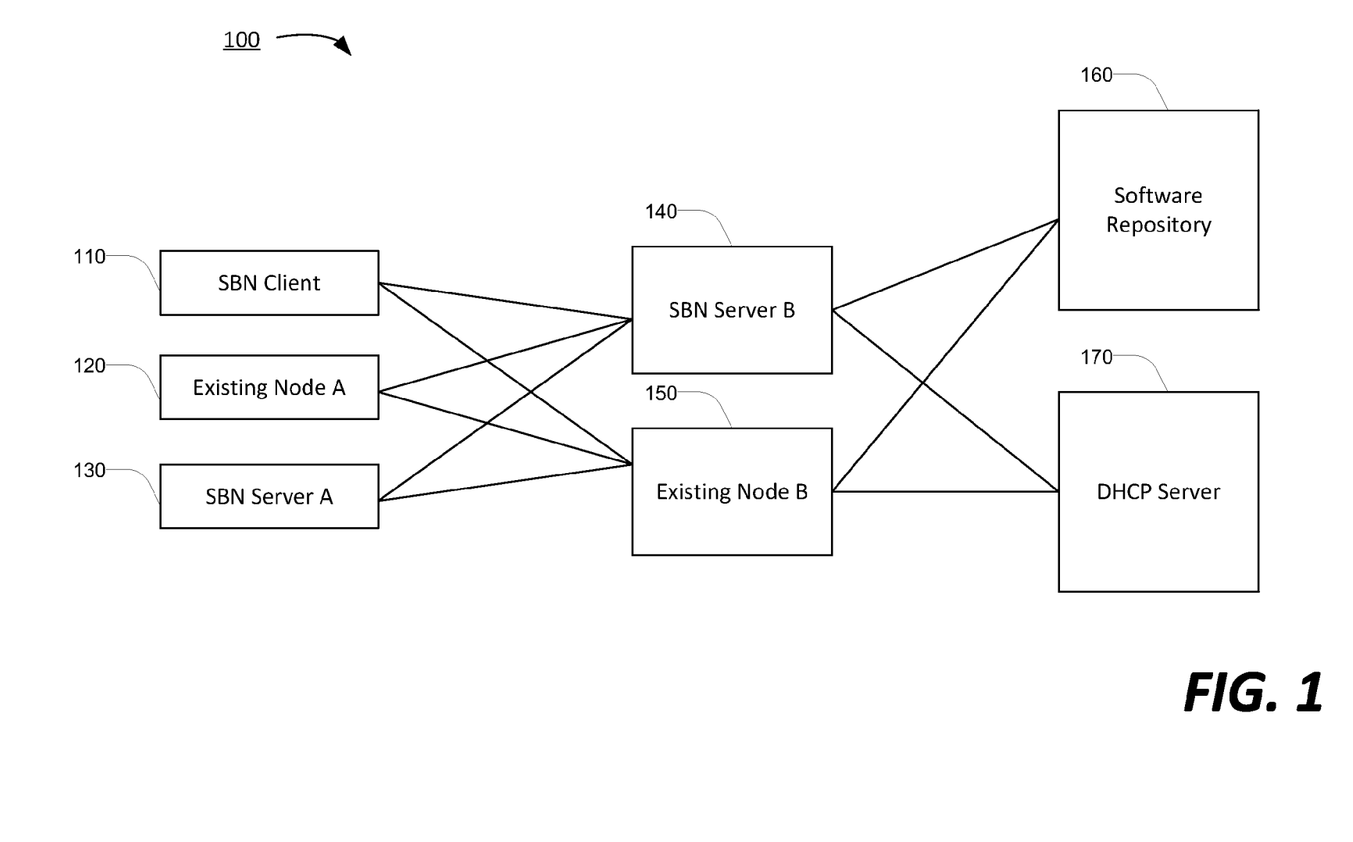
FIG. 1 illustrates an exemplary network in which nodes may provide services.

FIG. 1 illustrates an exemplary network 100 in which nodes may provide services. Network 100 may have point-to-point, bus, hub and spoke, ring, mesh, partial mesh, tree, hybrid, daisy chain, or other network topology. Exemplary subscriber network 100 may be a telecommunications network or other network for providing access to various services. Exemplary subscriber network 100 may include newly introduced node SBN client 110, Existing Nodes 120 and 150, SBN server nodes 130 and 140, Software Repository 160, and DHCP Server 170. Existing nodes 120 and 150 may not be configured as SBN servers.

Nodes 110-130 may be devices that enable communications between user devices and servers 140-150 to provide access to a packet data network for providing end-users with a data service. Such data service may include, for example, voice communication, text messaging, multimedia streaming, and Internet access. Nodes 110-130 and servers 140-150 may provide data services to user devices, or may provide access to a packet data network for providing end-users with a data service.

Software Repository 160 may be a server node communicatively connected to servers 140 and 150, and storing certified releases of network software. DHCP Server 170 may be a server node communicatively connected to servers 140 and 150, capable of dynamically distributing network configuration parameters, such as IP addresses.

Figure 2:
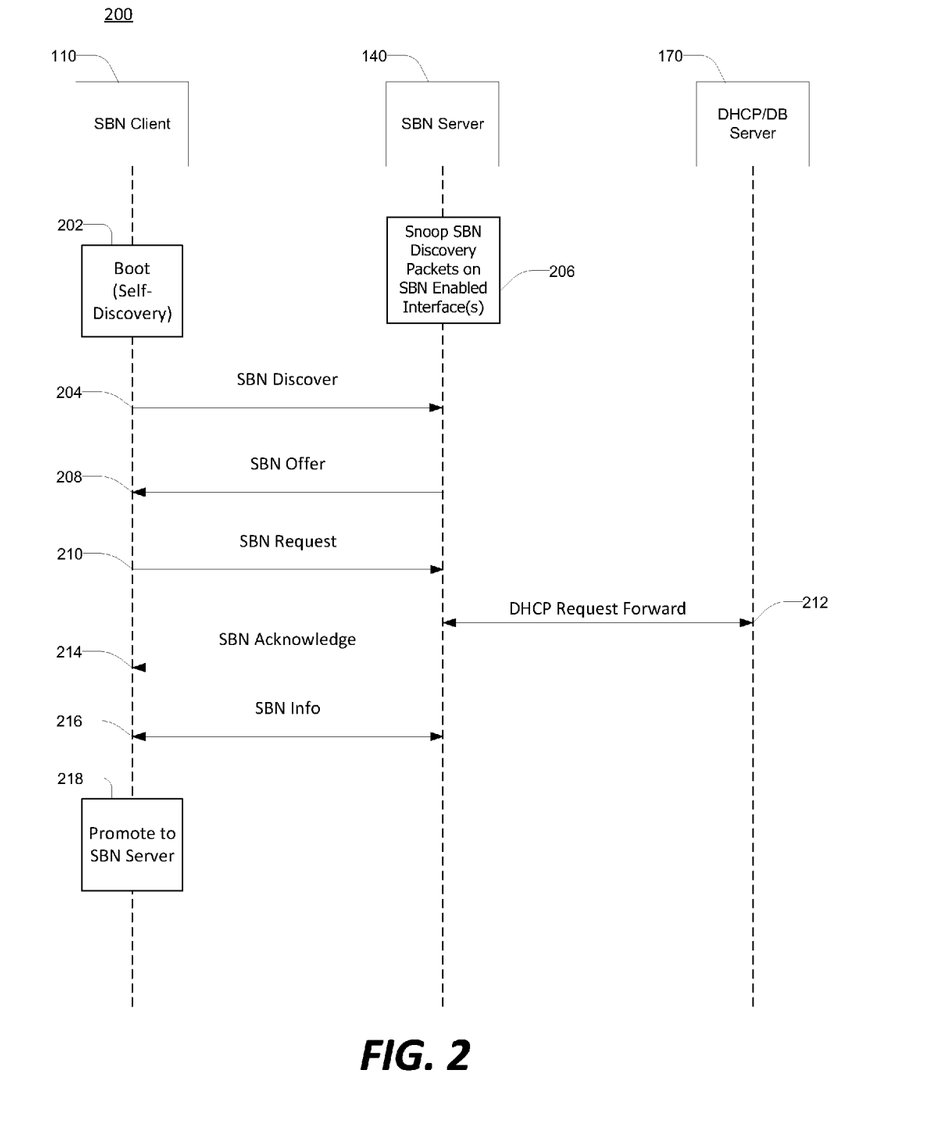
FIG. 2 illustrates an exemplary messaging scenario for handling the introduction of a new node into a network.

FIG. 2 illustrates a message diagram 200 showing an exemplary scenario for handling the introduction of a new SBN client node 110 into network 100. Message diagram 200 may illustrate messages sent between SBN client 110, SBN server 140, and DHCP server 170. Horizontal arrows may illustrate a message. It should be apparent that an arrow may represent both a step of sending a message and a step of receiving a message.

In step 202, SBN client may boot in SBN client mode, and conduct a self-discovery process, initializing each Ethernet port one at a time. As the ports initialize, SBN client 110 may broadcast an SBN Discover message 204 out of each fully initialized port, and then wait for SBN Offer messages. In some embodiments, SBN servers may wait for less network traffic or a designated "down" time before responding to SBN client requests, so as not to overwhelm the system during peak traffic. The SBN Discovery messages may identify the device and may provide authentication information. SBN messages may be transported over standard message formats such as DHCP. For example, SBN Discover packets may use DHCP Discovery message formats with Option 60, Vendor Class, set to "ALU-SBN" to identify the DHCP request as SBN; Option 61, Client Identifier, set to either the serial number of device or a user-defined string; and Option 40, the Vendor-Specific option, may be used for authentication information.

SBN server 140 snoops for SBN Discovery packets on SBN enabled interfaces 206. When SBN server 140 detects SBN Discover packets 204, it may evaluate the message for authentication information before responding. If authentication fails, SBN server 140 may send no response at all, or send a response indicating failed authentication. If authentication is successful or not required, SBN server 140 may send an SBN Offer message 208 to SBN client 110. The SBN Offer message 208 may include the SBN client's 110 interface IP assignment along with the location of the SBN Server 140. For example, if OSPF is to be used, the SBN server 140 may include the following configuration parameters, allowing the SBN client 110 to participate in the routing domain: area-id, area-range, authentication-key, authentication-type, BFD, dead-interval, hello-interval, interface-type, message-digest-key, metric, MTU, priority, retransmit-interval, transit-delay, area-type, summaries, timers, graceful-restart, preference, and/or reference-BW. Various configuration parameters necessary for configuring a new node would be known to one of skill in the art.

This message 208 may be transported over standard message formats such as DHCP. For example, Option 40, the Vendor-Specific option, may be used to send instructions from an SBN server to an SBN client. The SBN client may receive only one offer per message sent over each interface, and may ignore additional offer messages received by the same interface from the same or additional SBN servers. However, the client may receive offers from multiple interfaces. The client may evaluate all received offers to ensure no conflicting information. SBN client 110 may accept more than one offer if each offer is on a different interface. In this way, the SBN client 110 may bring multiple ports into service.

Once the SBN Client 110 selects an offer to accept it sends an SBN Request message 210 for each accepted offer. The SBN Request message 210 may request an IP assignment for the interface from which the SBN Discover message 204 was fired. The SBN server 140 may forward the request to DHCP Server 170. DHCP Server 170 may be remotely located from SBN Server 140, may be a separate application co-located with SBN server application 140, or may be a database (DB) of IP addresses reserved for new SBN client nodes. The SBN server 140 may snoop responses 212 from DHCP server 170 to add vendor specific options using SBN Auto-Discovery Protocol. SBN Server sends to SBN client 110 a message with an SBN Acknowledgement 214 of the request, which may contain the requested IP address information, and then wait for SBN client 110 to request a communications channel. These messages may be transported over standard message formats such as DHCP, using, for example, Vendor-Specific Option 40 for purposes of authentication.

Upon receiving the SBN Acknowledgement 214, the SBN client may program the relevant IP Address of the interface that fired the SBN Discover packet 204, as well as information relevant for communicating with the SBN server 170 using vendor specific options in DHCP protocol, the SBN client 110 may learn the location of the SBN server 140. In one such embodiment, SBN server B 140 may have been acting as an agent for SBN server A 130, and client node 110 may begin communicating directly with SBN server 130.

Once IP address and location information have been received 214 and provisioned, SBN client 110 may open an active channel to SBN server 140 for SBN information 216. The channel may use a transport layer that is reliable and ordered, such as TCP/IP. The channel may be authenticated, for example, by the serial number of the device or some other standard method.

Once authenticated, SBN server 140 sends one or more offers over one or more DHCP Offer messages. For example, once the communication channel is open and authenticated the SBN server 140 may advertise configuration based on its own readily available and configured network information or imported information, for example, using DHCP with vendor-specific options. Upon receiving the information, SBN client 110 may, for example, program security and routing configurations based on SBN Server's 140 Offer and associated instructions.

SBN servers communicating using a known protocol such as DHCP may use ASCII token-based instructions to exchange configuration information between networking devices using the channel. Examples of instructions 216 which may be exchanged over the channel include: a version instruction sent to determine which version of a protocol is being used by client 110 and server 140, to ensure compatibility between client and server; two or more audit instructions sent by client 110 to start or end configuration download (e.g. "begin", "end"); a sys-address instruction that may be sent by server 140 to set the system address of the client device (e.g. x.x.x.x); one or more context instructions that may be used to set the context of subsequent tokens, e.g. "-base" to set the base routing instance, "-port" to set port attributes, "-interface" to set interface attributes, "-ospf" to set OSPF attributes, "-user" to set user attributes, "-snmp" to set SNMP attributes"; various CLI Commands sent as tokens to be shared between the receiving device's command line interface and the SBN client application; and a "commit" instruction to commit changes to non-volatile memory.

Once SBN client 110 has received all available configuration information from SBN server 140, it may be promoted to an SBN server itself 218, becoming available to provide services on the network and to provision new nodes as they are introduced. In this way, the network is self-building.

Figure 3:
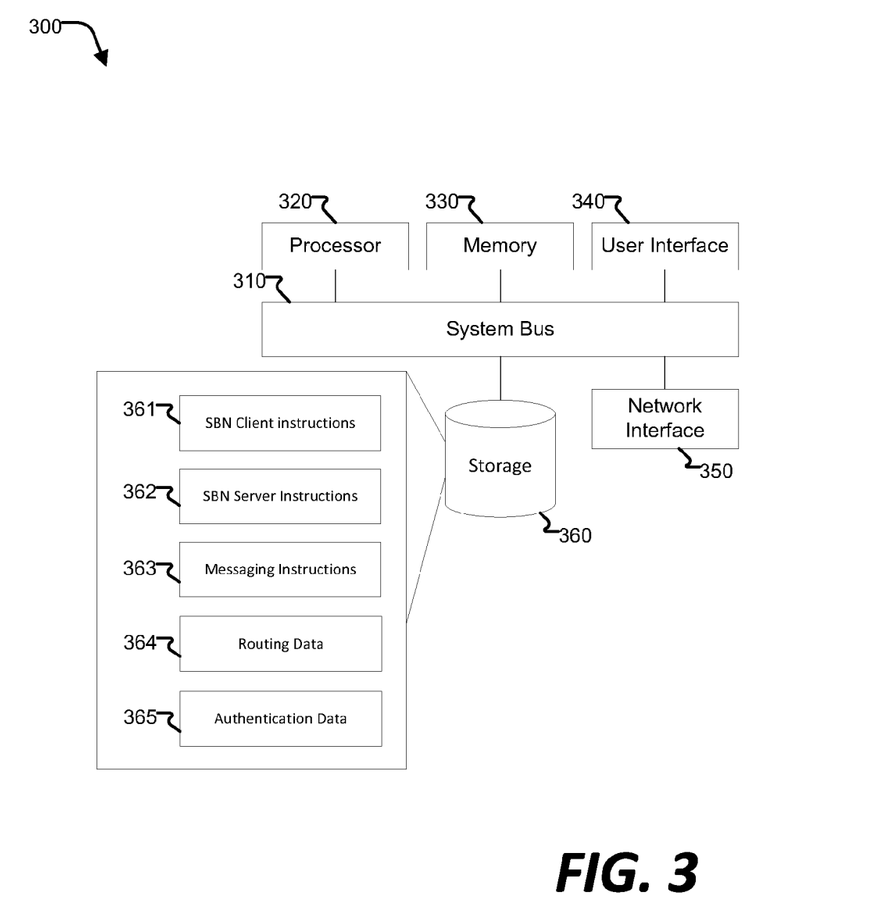
FIG. 3 illustrates an exemplary hardware diagram for implementing an SBN client or SBN server.

FIG. 3 illustrates an exemplary hardware diagram 300 for implementing an SBN client or SBN server. The exemplary hardware 300 may correspond to any of the devices shown in diagrams and processes 100 and 200. As shown, the hardware 300 includes a processor 320, memory 330, user interface 340, network interface 350, and storage 360 interconnected via one or more system buses 310. It will be understood that FIG. 3 constitutes, in some respects, an abstraction and that the actual organization of the components of the hardware 300 may be more complex than illustrated.

The processor 320 may be any hardware device capable of executing instructions stored in memory 330 or storage 360. As such, the processor may include a microprocessor, field programmable gate array (FPGA), application-specific integrated circuit (ASIC), or other similar devices.

The memory 330 may include various memories such as, for example L1, L2, or L3 cache or system memory. As such, the memory 330 may include static random access memory (SRAM), dynamic RAM (DRAM), flash memory, read only memory (ROM), or other similar memory devices.

The user interface 340 may include one or more devices for enabling communication with a user such as an administrator. For example, the user interface 340 may include a display, a mouse, and a keyboard for receiving user commands.

The network interface 350 may include one or more devices for enabling communication with other hardware devices. For example, the network interface 350 may include a network interface card (NIC) configured to communicate according to the Ethernet protocol. Additionally, the network interface 350 may implement a TCP/IP stack for communication according to the TCP/IP protocols. Various alternative or additional hardware or configurations for the network interface 350 will be apparent.

The storage 360 may include one or more machine-readable storage media such as read-only memory (ROM), random-access memory (RAM), magnetic disk storage media, optical storage media, flash-memory devices, or similar storage media. In various embodiments, the storage 360 may store instructions for execution by the processor 320 or data upon which the processor 320 may operate. For example, the storage 360 may SBN Client instructions 361 for booting an SBN client 110 and performing discovery and configuration tasks such as firing discovery packets and configuring settings received as SBN offer, acknowledgement, and information messages. The storage may store SBN server instructions 362 for snooping SBN discovery packets, sending relevant configuration information through messages using known protocols and specific instructions 363, such as that in routing data 364, and acting as an agent for remote servers such as a DHCP, software repository, or other SBN server. The storage 360 may also store authentication data 365 used for negotiating communications with network elements.

It will be apparent that various information described as stored in the storage 360 may be additionally or alternatively stored in the memory 330. In this respect, the memory 330 may also be considered to constitute a "storage device." Various other arrangements will be apparent. Further, the memory 330 and storage 360 may both be considered to be "non-transitory machine-readable media." As used herein, the term "non-transitory" will be understood to exclude transitory signals but to include all forms of storage, including both volatile and non-volatile memories.

While the hardware 300 is shown as including one of each described component, the various components may be duplicated in various embodiments. For example, the processor 320 may include multiple microprocessors that are configured to independently execute the methods described herein or are configured to perform steps or subroutines of the methods described herein such that the multiple processors cooperate to achieve the functionality described herein. Various other arrangements will be apparent.

According to the foregoing, various exemplary embodiments provide that after the configuration of a small number of nodes manually, the rest of the network may be built automatically via SBN message exchanges between new and existing nodes, without external server or manual user intervention. New nodes would be ready for service configuration automatically once inserted into an existing topology. The labor required to manually configure a node would approach zero, because as soon as physical installation of a node is completed and the IP and name assignment process automated using existing methods, the download of additional configuration required for the node to be ready to take on user data and start offering services would also be automatic, resulting in a seamless node provisioning activity, with no manual intervention or Administrator/Operator input; there would be no need for a network administrator to access to a node to configure reachability (e.g., routing), manageability, transport, etc. protocols/techniques. The time it is required to bring a network up in an e2e manner is drastically cut, hence network operators may start offering services sooner. The learning capability associated with an existing network element or elements minimizes up-front preparation work.

Upon implementation of SBN client/server capability within a network, nodes interact with each other, directly passing along configuration information. Note that the same SBN methodology may also be used to alter parameters network wide, without a need to dial to each and every node.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method performed by a network node device for provisioning the network node device on a network, the method comprising:
    discovering one or more ports;
    sending discovery messages from the one or more discovered ports;
    receiving an offer message comprising network information;
    storing the received network information;
    receiving a promotion message, wherein the network node device that has received all available configuration information is promoted to server status; and
    listening for discovery messages on one or more ports.

2. The method of claim 1, wherein the network information comprises one or more of a network interface address, a system address assigned to the network node device, a network node device network interface address, a loopback address for the network node device, and a default gateway address of the network node device.

3. The method of claim 1, further comprising:
    receiving one or more messages comprising configuration information.

4. The method of claim 3, wherein the configuration information comprises one or more of routing protocol information, node interface parameters, management parameters, operations and management (OAM) parameters, and Multiprotocol Label Switching (MPLS) parameters.

5. The method of claim 4, wherein the management parameters comprise an address for a management device, and the method further comprising:
    sending one or more messages to the management device.

6. The method of claim 1, further comprising:
    receiving one or more messages comprising software information;
    installing the software on the network node device; and
    rebooting the network node device after the software is installed.

7. The method of claim 1, wherein the discovery messages comprise authentication information.

8. The method of claim 1, wherein the step of sending discovery messages from one or more of the discovered ports further comprises:
    scanning the full virtual Local Area Network (vLAN) range.

9. The method of claim 1, wherein the step of storing the received network information further comprises:
    parsing configuration information from the offer message; and
    storing the configuration information to a data store corresponding to a port where the offer message was received.

10. The method of claim 1, further comprising:
    sending, to a server from which the offer message was received, a request for an active channel for information exchange.

11. A method performed by a network device for provisioning a network node device on a network, the method comprising:
    listening for discovery messages on one or more ports;
    detecting a discovery message from the network node device, the discovery message comprising a request for a network address assignment;
    sending, to a server capable of dynamically distributing network configuration parameters, a message comprising the request for the network address assignment;
    receiving a response from the server;
    sending, to the network node device, a message comprising the response from the server;
    collecting network configuration information from the network device; and
    sending, to the network node device, a message comprising the network configuration information.

12. The method of claim 11, wherein the configuration information comprises one or more of routing protocol information, node interface parameters, management parameters, operations and management (OAM) parameters, and Multiprotocol Label Switching (MPLS) parameters.

13. The method of claim 11, wherein the discovery message further comprises authentication information.

14. The method of claim 11, wherein the discovery message further comprises a request for one or more capabilities, and the step of collecting network configuration information from the network device further comprises:
    sending, to a server nod; a message comprising the discovery message, wherein the server node is advertising the requested capabilities; and
    receiving one or more responses from the server node.

15. The method of claim 14, wherein the step of sending to the network node device the message comprising the configuration information further comprises:
    sending, to the network node device, one or more messages comprising the one or more responses from the server node.

16. The method of claim 11, wherein the step of collecting network configuration information from the network device further comprises:
  collecting information from one or more of a port identified in the discovery message, one or more interface properties, and a template; and
  advertising the collected information.

17. The method of claim 11, further comprising:
  sending, to the network node device, a message comprising promotion information.

18. The method of claim 11, further comprising:
  recording virtual local area network (vLAN) information from the discovery message; and
  configuring, on a port where the discovery message was detected, a new interface based upon the vLAN information.

19. The method of claim 11, further comprising:
  deriving routing information for the network node from the response from the server; and
  storing the routing information in a routing table.

20. The method of claim 19, further comprising:
  sending, to the network node device, a message comprising routing information for a second network node stored in the routing table; and
  deleting the routing information for the second network node from the routing table.

* * * * *